July 1, 1952  R. H. WEBB  2,602,102
VARIABLE ANGLE ULTRASONIC TRANSDUCER
Filed April 13, 1950
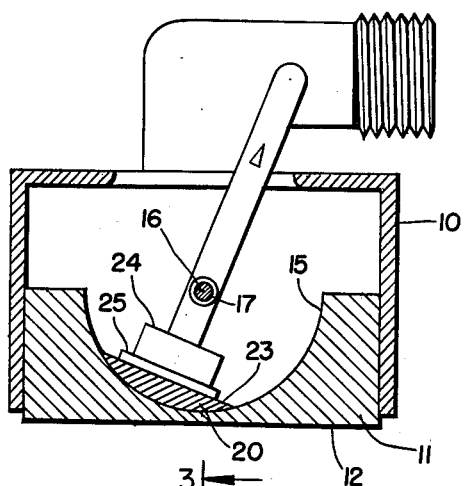
FIG. 1
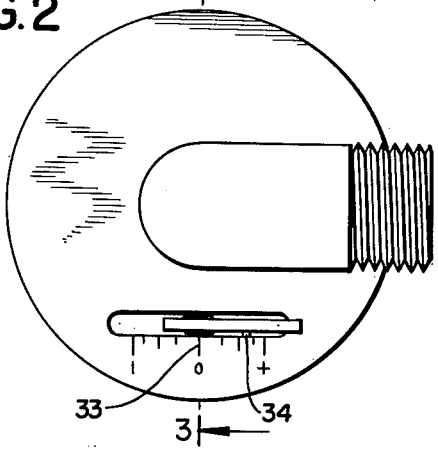
FIG. 2
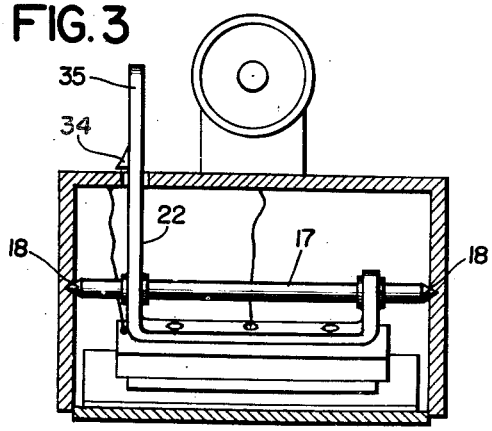
FIG. 3
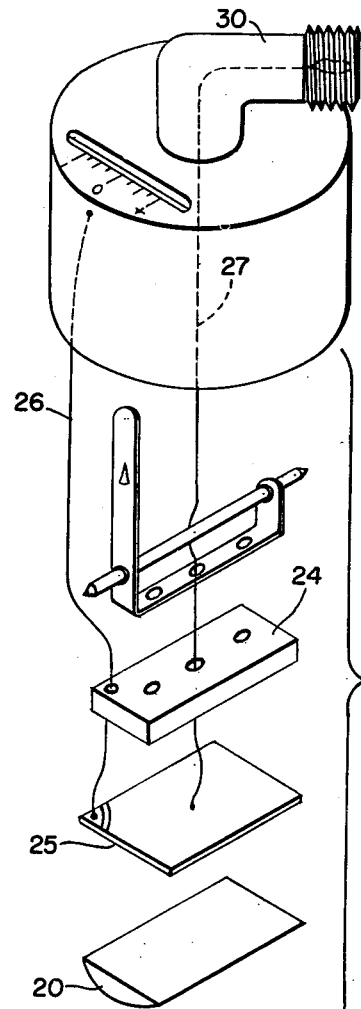
FIG. 4
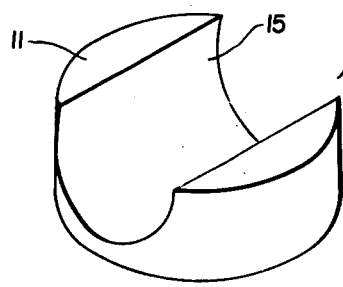
INVENTOR.
ROBERT H. WEBB
BY
Joseph H. Lipschutz
ATTORNEY.

Patented July 1, 1952

2,602,102

UNITED STATES PATENT OFFICE 2,602,102

VARIABLE ANGLE ULTRASONIC TRANSDUCER

Robert H. Webb, Danbury, Conn., assignor to Sperry Products, Inc., Danbury, Conn., a corporation of New York Application April 13, 1950, Serial No. 155,613

5 Claims. (Cl. 171—327)

This invention relates to variable angle electro-acoustic transducers whereby a single transducer is enabled to scan the interior of an object with vibrational waves, particularly in the ultrasonic range, for the purpose of inspecting the object. It has heretofore been proposed to accomplish this result by attaching a container filled with a liquid, such as oil or mercury, to the object and pivotally mounting the transducer in the liquid. This, however, resulted in difficulties in handling the liquid.

It is therefore the principal object of this invention to provide a variable angle electro-acoustic transducer which will avoid the difficulties inherent in fluid contact systems and which will be capable of quick application to a solid object to be inspected.

Further objects and advantages of this invention will become apparent in the following detailed description thereof.

In the accompanying drawings:

Fig. 1 is a vertical section through one embodiment of this invention.

Fig. 2 is a plan view of the Fig. 1 device.

Fig. 3 is a vertical section taken substantially on the line 3—3 of Fig. 2.

Fig. 4 is an isometric projection of the parts of the Fig. 1 device.

Referring to Fig. 1 it will be seen that the device may be supported in a casing 10 having a bottom closure in the form of a solid contact member 11 whose outer face 12 is adapted to engage the surface of the object under test. The inner surface of the contact member is formed with an arcuate groove 15, the center of the arc being located at 16 which is the axis of a rotatable shaft 17 supported at its ends 18 on the casing 10. A shoe 20 has its lower surface formed in an arc having its center in axis 16 and supported on a bracket 22 fixed to shaft 17. The shoe is supported in close engagement with the surface of arcuate groove 15 with only enough clearance for an oil film. The upper surface 23 of shoe 20 is formed to support a piezo-electric element 25 in the form of a quartz crystal in close engagement with the upper surface 23. The crystal may be provided with a damping block 24 on its rear face. The entire assembly of shoe, crystal and damping block may be supported from the bracket 22. An electrical connection 26 may be led from one face of the crystal to the casing 10 as a ground, while another electrical connection 27 from the other electrode of the crystal may be connected to the socket of a coaxial cable connector 30.

From the above description it will become apparent that the crystal if energized by electric oscillation will transmit mechanical vibrations into the object against which the surface 12 is held, and any mechanical vibrations received by the crystal from within the object will be transformed into electrical oscillations. In order that the crystal may be able to scan the interior of the object, the crystal assembly is rotatable on axis 16 to vary the angle of transmission and reception by the crystal. To facilitate such angular movement, the assembly may be provided with an operating member accessible from outside the casing 10. Such operating member may comprise an extension or handle 35 on bracket 22. This extension may have an index 34 to cooperate with a scale 33 on the casing to indicate the degree of angular relationship with respect to normal.

The contact member 11 and shoe 20 are formed of material having high acoustic conductivity with damping characteristics adapted for the particular application. Suitable material for many uses is methyl methacrylate.

Having described my invention, what I claim and desire to secure by Letters Patent is:

1. A variable angle electro-acoustic transducer comprising a solid member having one surface adapted to make contact with an object to be inspected, said member having an arcuate groove in the opposite surface thereof, a shoe having an arcuate surface of the same radius as said groove, means for supporting the shoe in close engagement with the surface of said groove for pivotal movement about the center of curvature of the groove, and a piezo-electric element supported on said shoe.

2. A variable angle electro-acoustic transducer comprising a solid member having one surface adapted to make contact with an object to be inspected, said member having an arcuate groove in the opposite surface thereof, a shoe having an arcuate surface of the same radius as said groove, means for supporting the shoe in close engagement with the surface of said groove for pivotal movement about the center of curvature of the groove, and a piezo-electric element supported on said shoe, said solid member and shoe being formed of high acoustic transmitting material.

3. A variable angle electro-acoustic transducer comprising a solid member having one surface adapted to make contact with an object to be inspected, said member having an arcuate groove in the opposite surface thereof, a shoe having an arcuate surface of the same radius as said groove, means for supporting the shoe in close engagement with the surface of said groove for pivotal movement about the center of curvature of the groove, said shoe having a surface opposite the arcuate surface, and a piezo-electric element supported on said opposite surface.

4. A variable angle electro-acoustic transducer comprising a solid member having one surface adapted to make contact with an object to be inspected, said member having an arcuate groove in the opposite surface thereof, a shoe having an arcuate surface of the same radius as said groove, means for supporting the shoe in close engagement with the surface of said groove for pivotal movement about the center of curvature of the groove, said shoe having a flat surface opposite the arcuate surface, and a piezo-electric element supported on said flat surface.

5. A variable angle electro-acoustic transducer comprising a casing, a solid member fixed in said casing and having one surface adapted to make contact with an object to be inspected, said member having an arcuate groove in the opposite surface thereof, and a piezo-electric assembly mounted in said casing for pivotal movement about the center of said arcuate surface, said assembly comprising a shoe having an arcuate surface of the same radius as said groove, a piezo-electric element supported on said shoe, and means for supporting said shoe in close engagement with the surface of said groove.

ROBERT H. WEBB.

REFERENCES CITED

The following references are of record in the file of this patent:

UNITED STATES PATENTS

| Number | Name | Date |
| --- | --- | --- |
| 2,378,237 | Morris | June 12, 1945 |
| 2,460,153 | Smoluchowski | Jan. 25, 1949 |